United States Patent
Manzella et al.

(10) Patent No.: US 6,460,488 B1
(45) Date of Patent: Oct. 8, 2002

(54) ANIMAL LEASH AND METHOD OF MANUFACTURE

(76) Inventors: Joseph Frank Manzella, 7220 8th Ave. W, Bradenton, FL (US) 34209; Randolph Scott Beeman, 2215 Cork Oak St., Sarasota, FL (US) 34232

( * ) Notice: Subject to any disclaimer, the term of this patent is extended or adjusted under 35 U.S.C. 154(b) by 0 days.

(21) Appl. No.: 09/886,712

(22) Filed: Jun. 21, 2001

Related U.S. Application Data (63) Continuation-in-part of application No. 09/876,656, filed on Jun. 7, 2001.

(51) Int. Cl.$^7$ ............................................. A01K 27/00
(52) U.S. Cl. ..................... 119/798; 199/795; 199/712; 199/769
(58) Field of Search .............................. 119/798, 712, 119/758, 769, 770, 774, 792, 793, 795, 802; D30/153; 473/417; 182/3; 128/846, 869; 248/925; 24/115 R

(56) References Cited

U.S. PATENT DOCUMENTS

| | | | | |
|---|---|---|---|---|
| 144,198 A | * | 11/1873 | Ford | 119/771 |
| 587,526 A | * | 8/1897 | Holden | 24/115 R |
| 866,144 A | * | 9/1907 | Kobert | 24/115 R |
| 1,614,083 A | * | 1/1927 | Plantico | 119/793 |
| 2,740,654 A | * | 4/1956 | Orschel | 24/115 R |
| 3,867,905 A | * | 2/1975 | Vail, Jr. | 119/793 |
| 3,897,161 A | * | 7/1975 | Reinwall, Jr. | 24/115 R |
| 4,100,996 A | * | 7/1978 | Sharp | 182/3 |
| 4,480,589 A | * | 11/1984 | Schneider | 119/865 |
| 4,488,511 A | * | 12/1984 | Grassano | 119/798 |
| 4,878,269 A | * | 11/1989 | Anscher et al. | 24/115 G |
| 4,974,549 A | * | 12/1990 | Gordon | 119/793 |
| 5,146,876 A | * | 9/1992 | McPhail | 119/798 |
| 5,345,656 A | * | 9/1994 | Merritt | 24/115 H |
| 5,732,663 A | | 3/1998 | Manzella | |
| 6,047,665 A | * | 4/2000 | Deveaux | 119/770 |
| 6,085,696 A | * | 7/2000 | Fisher | 119/798 |
| 6,095,094 A | * | 8/2000 | Phillips | 119/792 |
| 6,269,777 B1 | * | 8/2001 | Prusia et al. | 119/792 |

FOREIGN PATENT DOCUMENTS

| JP | 11018611 A | * | 7/1997 | .......... A01K/27/00 |

\* cited by examiner

*Primary Examiner*—Peter M. Poon
*Assistant Examiner*—Andrea M. Valenti
(74) *Attorney, Agent, or Firm*—Dorothy S. Morse

(57) ABSTRACT

An animal leash, and a method of manufacture, having at least three flexible cords, at least one locking mechanism for joining the cords in end-to-end relation, a resilient freely rotating handle configured for user comfort and enhanced grip, and a bolt snap for animal collar connection. The material used for the middle cord would comprise a small amount of longitudinal stretch, enough to allow a lunging animal to move slowly forward a short distance beyond its non-stretched length and then gently urge the animal to withdraw from its lunging position, thus enhancing the comfort of animal and animal owner alike, protecting the animal during its attachment to stationary objects and attempts to lunge at other objects, as well as protecting the animal owner's arms, shoulders and back from the abrupt and substantial wrenching forces that would otherwise be experienced during attempts to control a lunging animal.

20 Claims, 5 Drawing Sheets

ANIMAL LEASH AND METHOD OF MANUFACTURE

This is a continuation-in-part patent application of the co-pending U.S. patent application Ser. No. 09/876,656, filed on Jun. 7, 2001, by the inventors herein, Joseph F. Manzella and Randolph S. Beeman, and the inventors request that they be permitted to derive any benefit to which they are entitled from the above-referenced earlier filed non-provisional patent application.

BACKGROUND—FIELD OF INVENTION

This invention relates to animal leashes and other means used to restrain animals while they are being taken for a walk or while tethered to stationary objects, specifically to an animal leash, and method for its manufacture, with various embodiments of the present invention having three or more flexible cords connected together in end-to-end working relation by one or more cord-locking mechanisms, at least one of the cords being stretchable, and a second cord supporting a freely rotatable handle configured for a secure user grip. Two separable clamping members form each cord-locking mechanism, with threaded fasteners firmly fixing them together during use around cords extending in opposite directions. Each tubular passage, formed by opposing channels in the paired clamping members and into which the blunt end of one cord can be inserted, has a combination of angled teeth and ridges configured to grip any flexible cord substantially filing it, to prevent the secured cord from being suddenly withdrawn when a significant extracting force is applied, such as that which would be expected from a lunging animal attached to the leash. The dimension and number of channels formed in each clamping member during manufacture can vary. Thus, the present invention can use a single stretchable central cord to secure one animal, multiple stretchable central cords to secure an exceptionally large or strong animal, or multiple stretchable central cords to simultaneously secure more than one animal. When three cords and two cord-locking mechanisms would be used to secure one animal, it is contemplated for each cord-locking mechanism to have a tapering octagonal configuration and for the three cords to be unequal in length, with the centrally positioned cord being stretchable, significantly longer than the other two cords, and connected between the narrow ends of the two cord-locking mechanisms. The ends of the two shorter cords would each be secured within the wider end of a different cord-locking mechanism, so as to be formed into a loop. During use of the present invention, a snap-bolt or other type of clip would be attached to the shortest loop, for connection to the type of D-ring typically found on animal collars, while the other looped cord would be threaded through an axial bore in the freely rotatable handle. The stretchable center cord would be made from rubber or an extruded rubber-like material having a small amount of longitudinal stretch, enough to allow a lunging animal to move slowly forward a short distance beyond the non-stretched length of the leash, after which the animal would be promptly caused to reverse its direction of movement and expediently withdraw from its lunging position without injury to animal or the person connected to it on the other end of the leash. The combination of slightly stretchable cord and freely rotating handle contemplated by the present invention would enhance the comfort of animal and animal handler alike during a walk, protect an animal when it is secured to stationary objects during attempts to lunge at out-of-reach objects, as well as protect the hands, wrists, arms, shoulders, neck, back, hips, and knees of animal handlers from the sudden and substantial wrenching movement that would otherwise be experienced during attempts to control an active animal. Thus, although not limited thereto, one preferred application of the present invention would be for use by pet owners who may often be stiff or experience joint pain as a result of diseases such as osteoarthritis, since the present invention would give the pet owner gentle control of the pet, eliminate most of the jarring and jolting to hands, wrists, arms, shoulders, neck, back, hips, and/or knees during the handling of the pet, and give a pet owner more reaction time when his or her pet suddenly moves to lessen instability that could lead to a fall.

BACKGROUND—DESCRIPTION OF PRIOR ART

Walking an animal on a leash can be an uneventful experience, with the animal calmly moving at an even pace throughout the period of exercise and no bodily stress placed upon the person taking the animal for a walk. However, at any moment during a walk even the most well-mannered animal can be distracted by a fast moving squirrel, cat, bicycle, automobile, or child, resulting in an abrupt pulling force on the animal leash that can translate into a sudden wrenching motion to the wrists, hands, arms, shoulders, neck, knees, hips, and back of the person walking the animal. Many animal leashes are made from non-stretchable material and provide no protection from these types of sudden pulling forces that can unexpectedly occur. Even retractable animal leashes that allow more freedom of movement to an animal, do not prevent an abrupt jerking force to the arms, shoulders and back of the person using it to control the animal when it reaches the fully extended length of the coiled restraint cord. Occasionally such leashes can be pulled completely out of the hands of the owner when a large dog attached to the leash ardently pursues a squirrel or cat that is surprised by the dog and suddenly runs away from it. Although stretchable animal leashes made from bungee cord material, such as the stretch leash in U.S. Pat. No. 5,732663 to Manzella (1998), are effective for allowing dogs more freedom of movement while being walked and assisting dog owners in teaching dogs to heel, their extensive bungee-cord-like stretching ability does not make them as well-suited for handling dogs that are apt to frequently and unexpectedly lunge. Since the most preferred embodiment of the present invention is made from three separate cords, an elongated center cord and two looped end cords, the various cords can be made from the same material or different materials as dictated by the amount of cord stretch preferred in each intended application for the maximum user comfort. The quickly assembled and promptly separable cord-locking mechanisms provide easy access to the cords so that they can be easily exchanged to satisfy changing needs, such as the substitution of a longer cord, or one with more or less elasticity, as a puppy gains weight and matures into an adult dog, or for walking and tethering different pets owned by the same person. The cord-locking mechanisms of the present invention securely hold onto the ends of the animal leash cords until the threaded fasteners holding its two clamping members together are deliberately released. The rotating handle with its central core and bushing provide for both enhanced user comfort and prolonged durability of the outer foam grip. There is no known animal leash with all of the features of the present invention, or one that provides all of its advantages.

SUMMARY OF INVENTION—OBJECTS AND ADVANTAGES

The primary object of this invention is to provide an animal leash that protects an animal owner's hands, wrists, arms, shoulders, neck, hips, knees, and back from the sudden and substantial wrenching motion that is often experienced with other animal leashes when an animal that is being taken for a walk suddenly and forcefully lunges at an out-of-reach object. It is also an object of this invention to provide an animal leash that gives pet owners more time to react to sudden pet movement and thereby lessen the type of owner instability that can lead to a fall. It is a further object of this invention to provide an animal leash that also enhances the comfort of the animal as it lunges for an out-of-reach object. It is also an object of this invention to provide an animal leash that enhances the grip of the person using it for better control of the animal, as well as increased user comfort. A further object of this invention is to provide an animal leash that is made from weather-resistant materials, is sturdy and durable in construction, and easy to use. It is also an object of this invention to provide an animal leash with cord-locking devices that are compact and have an aesthetically pleasing design. A further object of this invention is to provide an animal leash that is not easily tangled during use, and can be adapted for changing needs, such as the maturing of a puppy into an adult dog. It is also an object of this invention to provide an animal leash that can be easily manufactured for a relatively inexpensive unit cost.

As described herein, properly manufactured and used, the present invention animal leash would provide a useful restraint for animals while they are being walked, particularly animals that have a tendency to unexpectedly and forcefully lunge at objects beyond their reach. The most preferred embodiment would have three cords secured in end-to-end relation by two locking mechanisms. The centrally positioned cord would be made from extruded construction and rubber or rubber-like materials that give it that capability of a small amount of longitudinal stretch, enough to allow a lunging animal to move slowly forward a short distance beyond the non-stretched length of the leash and then promptly urge the animal to slowly withdraw from its lunging position. As a result, the present invention absorbs most of the abrupt wrenching movement that would otherwise be translated to the animal owner's hands, wrists, arms, shoulders, neck, hips, knees, and back, and be a likely cause of injury or pain. A comfort advantage would be provided to both animal and animal owner alike. Also, the additional time allowed while the stretchable cord is being extended, even though brief, would permit the person walking a pet to take a step forward, or otherwise react to regain balance, and lessen the likelihood of a fall. The three-part construction of the handle in the present invention also offers advantages to its user. The handle contains a central core with an axial bore that is slightly larger in dimension than the outside diameter of the supporting cord, so that the supporting cord is fully movable within the axial bore. The grip material that is directly in contact with the user's hand is resilient and attached to a bushing so that it is independently rotatable from the central core. Such a multiple layer construction improves the durability of the outer grip material, thus giving the user an extended period of comfortable use. Also, since all pulling forces are translated through the bushing and central core, the resilient grip material remains in its original condition for a longer period of time, enhancing the grip of the person using it for better control of the attached animal. The plastic and foam rubber materials contemplated for manufacture of the preferred embodiment handle are all weather-resistant. Further, the swivel in the snap-bolt contemplated for animal collar attachment in the most preferred embodiment of the present invention animal leash helps to keep the longer middle cord from becoming easily tangled during use. In addition, the plastic and foam materials used for manufacture of the present invention, and the simple design of it components, allow it to be easily manufactured for a relatively inexpensive unit cost. The angled teeth and ridges in each channel within the clamping members of the most preferred cord-locking mechanism are used to accept and secure the ends of the three cords used, and provide a secure connection of the cords without slippage or separation until the clamping devices are deliberately released. It is contemplated for each cord-locking mechanism to be made from rigid, high impact strength materials, which would also be lightweight and easily handled, non-corroding and durable for extended use. The quickly assembled and separated clamping members in each cord-locking mechanism make the cords easily exchanged to satisfy changing needs, such as substitution of a longer cord, or one with more or less elasticity, as a puppy gains weight and matures into an adult dog, or for successively walking and tethering different pets owned by the same person.

The description herein provides the preferred embodiments of the present invention animal leash, but should not be construed as limiting its scope. For example, variations in the length of the cords used; the number of cords used; the materials from which the cords are made; the size and configuration of the locking mechanisms used; the number of angled teeth and ridges used in each channel of the clamping members; the thickness of the angled teeth and ridges used,; the number and size of the threaded fasteners used to connect the clamping members together in each locking mechanism used; and the type of dog collar connection used, other than those shown and described herein may be incorporated into the present invention. Thus the scope of the present invention should be determined by the appended claims and their legal equivalents, rather than the examples given.

DETAILED DESCRIPTION OF PREFERRED EMBODIMENTS

Figure 1:
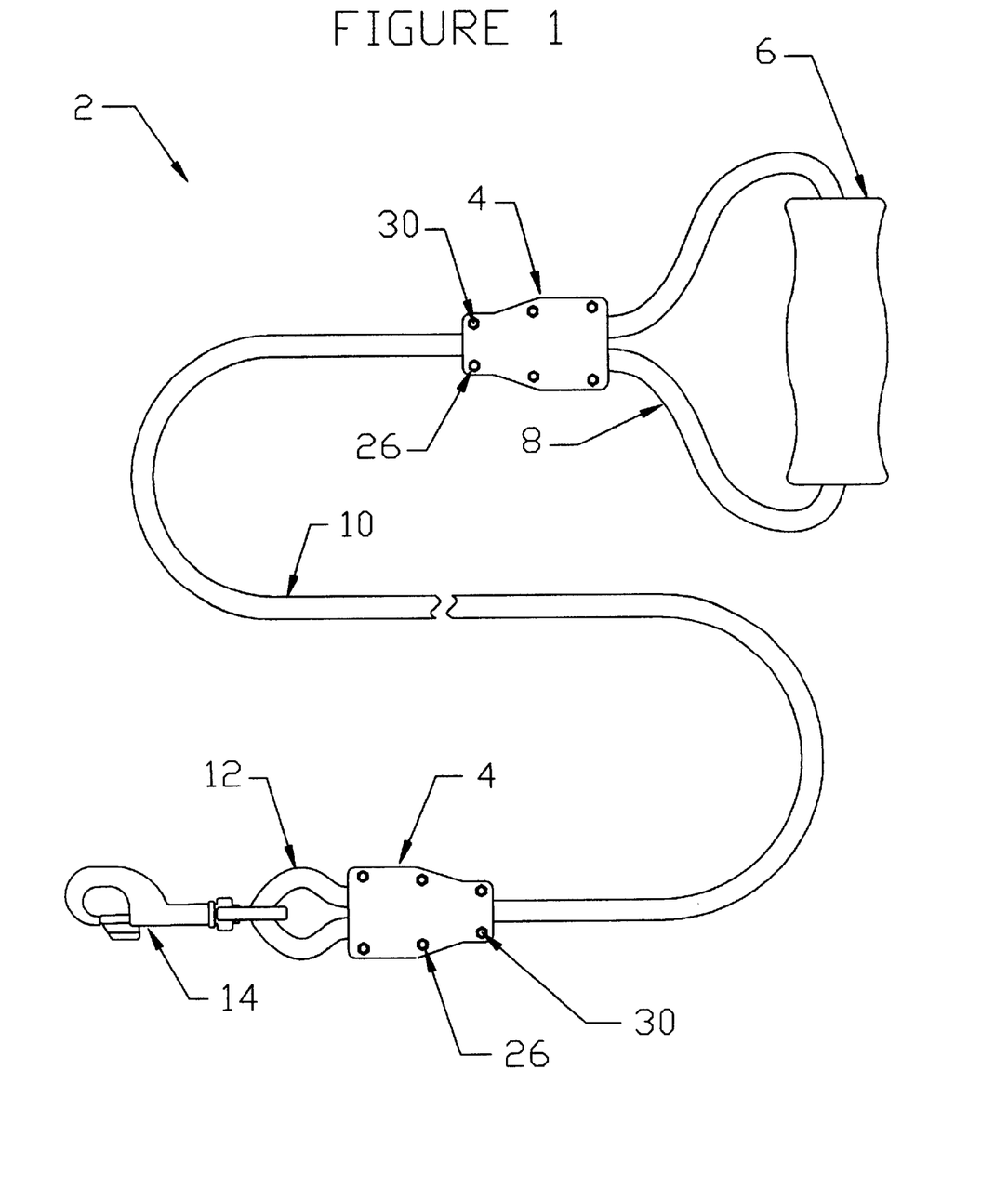
FIG. 1 is a top view of the most preferred embodiment of the present invention animal leash having three cords with one being an elongated middle cord, two locking mechanisms that connect the cords together and form each of the two end cords into a looped configuration, a handle attached to one looped cord, and a snap-bolt connected to the remaining looped cord.

FIG. 1 shows the most preferred embodiment 2 of the present invention animal leash, having two cord-locking mechanisms 4 which connect elongated cord 10 between shorter cords 8 and 12, and cords 8 and 12 each into a looped configuration. The most preferred embodiment 2 also has a handle 6 connected to cord 8, and a snap-bolt 14 connected to cord 12. Both locking mechanisms 4 have an elongated and tapering octagonal configuration. The opposing ends of cord 10 are each secured within the narrower end of a different one of the locking mechanisms 4, while the opposing ends of cords 10 and 12 are each secured into a different one of the adjacent channels 24, shown in FIG. 2, within the wider end of a different one of the locking mechanisms 4, which causes it to be formed into a loop. FIG. 1 further shows the bolts 30 and hex nuts 26 in their usable positions and tightened to fix cords 8, 10, and 12 securely within their respective locking mechanisms 4. Although a small amount of longitudinal elasticity is desired, it is contemplated for middle cord 10 to be made from a substantially non-stretchable extruded material, such as dense rubber or plastic. The remaining cords 8 and 12 could be made from the same material used for cord 10, or different materials suited to the intended application and enhancement of user comfort. Also in the most preferred embodiment, both locking mechanisms 4 would be made from a rigid plastic material, with recycled plastic being utilized where practical. Further, the outer surface of handle 6 would be made from a resilient material, such as foam rubber, and snap-bolt 14 used for animal collar attachment could be made from a variety of rigid, durable, and noncorroding materials, including metals such as stainless steel or nickel plated steel. Other animal collar clips could be used in place of snap-bolt 14, however, it is preferred that they be easy to use, quick releasing, and contain a swivel mechanism to prevent entanglement of the leash during use. The lengths of cords 8, 10, and 12 are not critical, nor are their diameter dimensions as long as each substantially fills the tubular passage within locking mechanism 4 into which it is inserted so that it remains firmly secured within locking mechanism 4 until deliberately released therefrom by the loosening of bolts 30 and hex nuts 26. Further, the number of apertures in locking mechanism 4 for receipt of bolts 30, shown in FIGS. 2 and 4 by the number 22, is not critical as long as there are a sufficient number of apertures 22 used to firmly fix cords 8, 10, and 12 within locking mechanism 4 while under load, and there is no undue multiplication of the number of apertures 22 without appropriate benefit.

Figure 2:
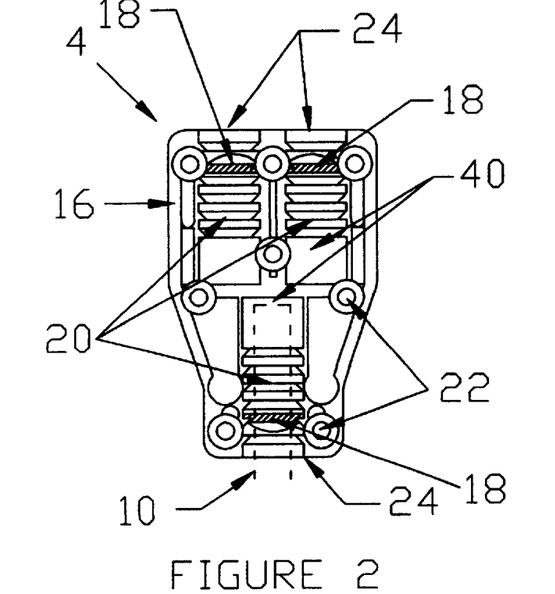
FIG. 2 is a front view of the inside surface of a first half of the most preferred embodiment of the present invention locking mechanism usable for three-way cord connection, with the first half having three channels, each channel having one ridge adjacent to its exterior end and three angled teeth proximal to the ridge, the first half also having seven spaced-apart apertures near its perimeter for attachment of threaded fasteners, as well as one similarly dimensioned aperture that is centrally located, with all apertures being positioned adjacent to, but not directly in, any of the channels, the first half further having broken lines showing desired positioning of a cord within one of the channels.
Figure 3:
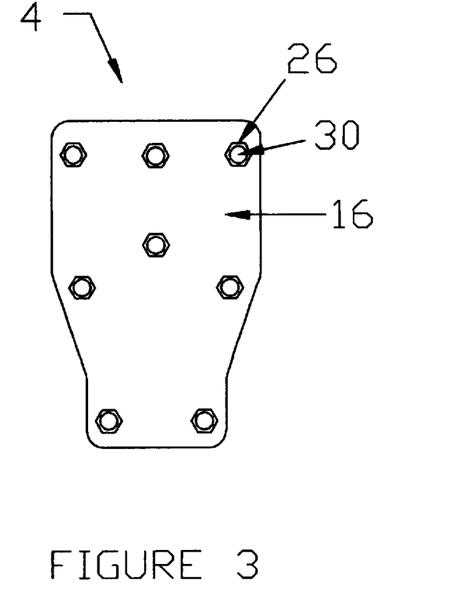
FIG. 3 is a front view of the outside surface of the first half of the most preferred embodiment of the present invention locking mechanism, with the first half having eight hex nuts each positioned around a central fastener, the fastener and hex nut combinations each being aligned with a different one of the apertures shown in FIG. 2.
Figure 4:
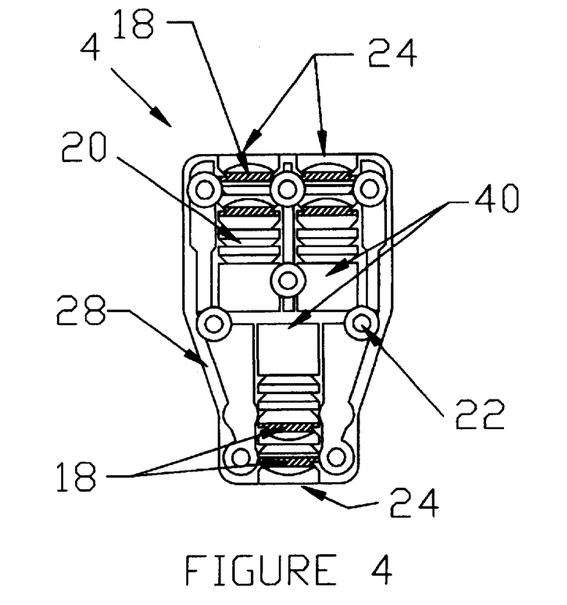
FIG. 4 is a front view of the inside surface of the second half of the most preferred embodiment of the present invention locking mechanism usable for three-way cord or tubing connection, with the second half having three channels, each channel having two ridges adjacent to its exterior end and two angled teeth proximal to the ridges, the second half also having seven spaced-apart apertures near the perimeter of the second half for attachment of threaded fasteners, as well as one similarly dimensioned aperture that is centrally located, with all apertures being positioned adjacent to, but not directly in, and of the channels and each being aligned with a different one of the apertures shown in FIG. 2.
Figure 5:
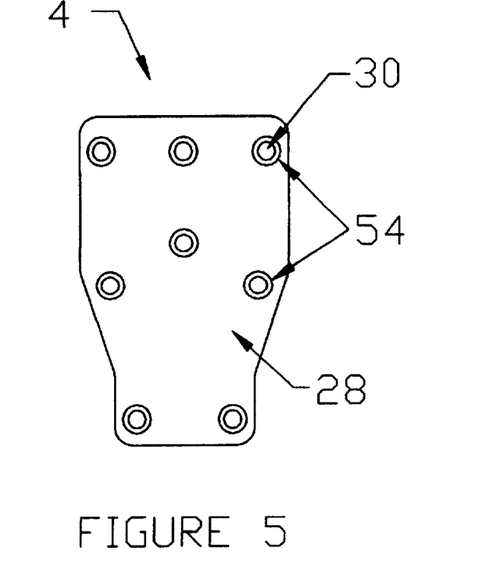
FIG. 5 is a front view of the outside surface of the second half of the most preferred embodiment of the present invention locking mechanism, with the second half having eight countersunk holes each configured for the recessed positioning of a fastener head, the countersunk holes and fastener combinations each being aligned with a different one of the apertures shown in FIGS. 2 and 4.

FIGS. 2, 3, 4, and 5 show a first preferred embodiment of the present invention, having a first clamping member 16 and an opposing second clamping member 28 used together for a three-way connection of cords, such as cords 8, 10, and 12 in FIG. 1, to one another or to itself to form a loop. FIGS. 2 and 3, respectively, show the inside and outside surfaces of first clamping member 16. FIGS. 4 and 5, respectively, show the inside and outside surfaces of second clamping member 28. The threaded fasteners used to connect first clamping member 16 to second clamping member 28 during use are not shown in a separate illustration, as it is contemplated for commonly available bolts and hex nuts to be used, such as bolts 30 and hex nuts 26 shown in FIG. 3. Although not critical, in the first preferred embodiment it is contemplated for first clamping member 16 and second clamping member 28 to be comparable in size and thickness dimension. FIG. 2 shows first clamping member 16 having a unitary molded construction with three longitudinally extending channels 24 formed into the inside surface thereof. Two of the channels 24 are upwardly extending, with the third channel 24 extending in an opposed downwardly extending position, with broken lines in the downward extending channel 24 showing the desired position of cord 10 when it is in its near optimal secured position within channel 24. Within each channel 24, FIG. 2 shows three angled teeth 20, one ridge 18, and a cavity 40, the angled teeth 20 being positioned between cavity 40 and ridge 18, with cavity 40 being within the interior end of channel 24 and ridge 18 being near to the exterior end of channel 24. Also, the exterior end of each channel 24 is open to allow the remaining portions of cords 8, 10, and 12 to extend beyond channels 24. The angled teeth 20 in each channel 24 are each configured to resist the withdrawal of cord 10 across ridge 18 and out from the open exterior end of channel 24. FIG. 2 also shows seven apertures 22 in spaced-apart positions near to the perimeter of first clamping member 16, as well as one centrally positioned aperture 22 between the two upwardly extending channels 24. The exact positioning of the centrally located aperture 22 is not critical as long as it does not interfere with insertion of cords 8, 10, and 12 into any channel 24. It can be seen in FIG. 2 that one of the apertures 22 is positioned laterally on each side of each of the three ridges 18. The number of apertures 22 used is not critical, and more than eight apertures 22 could be used when appropriate to the intended application. A number of apertures 22 less than eight could also be used for some applications, although use of less than eight apertures is generally not preferred when the cords inserted into channels 24, such as cords 8, 10, and 12 shown in FIG. 1, would be subjected to abrupt withdrawing force of a lunging animal. The number and length of channels 24, the number and width of angled teeth 20, and the number and width of ridges 18 used are also not critical, with the numbers, length, and widths being determined by the intended application. FIG. 3 shows the outer surface of first clamping member 16 having eight hex nuts 26 attached thereto and each secured to the end of a bolt 30. The hex nuts 26 are each located in a different position corresponding to one of the apertures 22 shown in FIG. 2. Although the outer surface of first clamping member 16 can be made so that hex nuts 26 remain raised above the outer surface when they are in their usable positions, it is preferred that hex-shaped cutouts (not shown) would be made in the outer surface of first clamping member 16 during manufacture so that hex nuts 26 can be countersunk below the outer surface of first clamping member 16 while in use.

Figure 8:
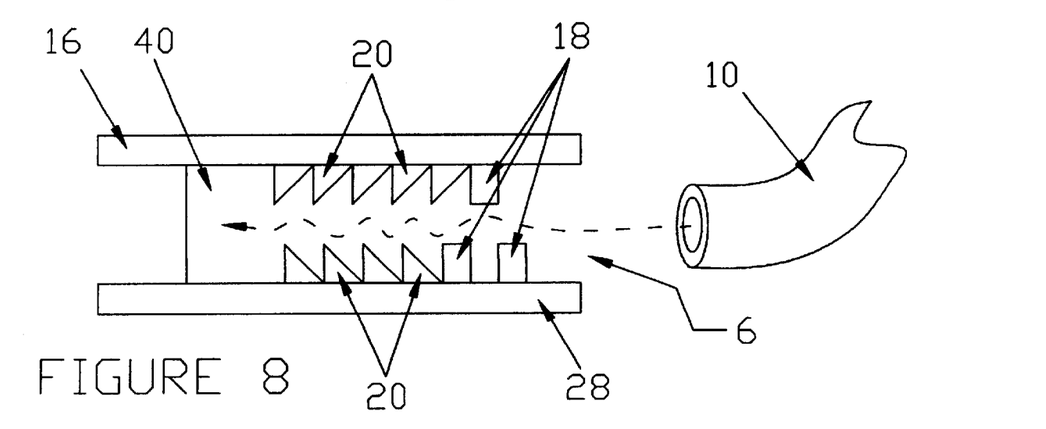
FIG. 8 is a schematic cross-sectional side view of one tubular passage in the most preferred embodiment of the present invention clamp, with a piece of cord poised for entry into the exterior end of the tubular passage and an arrowhead attached to a broken line showing the zigzag positioning of the cord once secured inside the tubular passage.

FIGS. 4 and 5, respectively, show the inside and outside surfaces of second clamping member 28. FIG. 4 shows second clamping member 28 having a unitary molded body construction with three longitudinally extending channels 24 formed into the inside surface thereof. Two of the channels 24 are upwardly extending, with the third channel 24 extending in an opposed downwardly extending position. Within each channel 24, FIG. 4 shows two angled teeth 20, two ridges 18, and a cavity 40, the angled teeth 20 being positioned between cavity 40 and ridge 18, with cavity 40 being within the interior end of channel 24 and ridge 18 being near to the exterior end of channel 24. Angled teeth 20 are each configured to resist the withdrawal of cord 10 across ridge 18 and out from the open exterior end of channel 24. Further, when FIGS. 4 and 5 are compared, and as also shown in FIG. 8, it can be see that the angled teeth 20 and ridges 18 in first clamping member 16 and second clamping member 28 are off-set from one another to better secure cord 10 therebetween. FIG. 4 also shows seven apertures 22 in spaced-apart positions near to the perimeter of second clamping member 28, and one centrally positioned aperture 22 between the two upwardly extending channels 24, each in a corresponding position to a different one of the seven apertures 22 in FIG. 2. It can be seen in FIG. 4 that one of the apertures 22 is positioned laterally on each side of each of the three ridges 18 that are the closest to the exterior ends of channels 24. FIG. 5 shows the outer surface of second clamping member 28 having eight bolts 30 each located in a different position corresponding to one of the apertures 22 shown in FIG. 4. Although the outer surface of second clamping member 28 can be made so that heads of bolts 30 remain raised above the outer surface when they are in their usable positions, it is preferred that round cutouts 54 would be made in the outer surface of second clamping member 28 during manufacture so that the head of bolts 30 can be countersunk below the outer surface of second clamping member 28 while in use.

Figure 6:
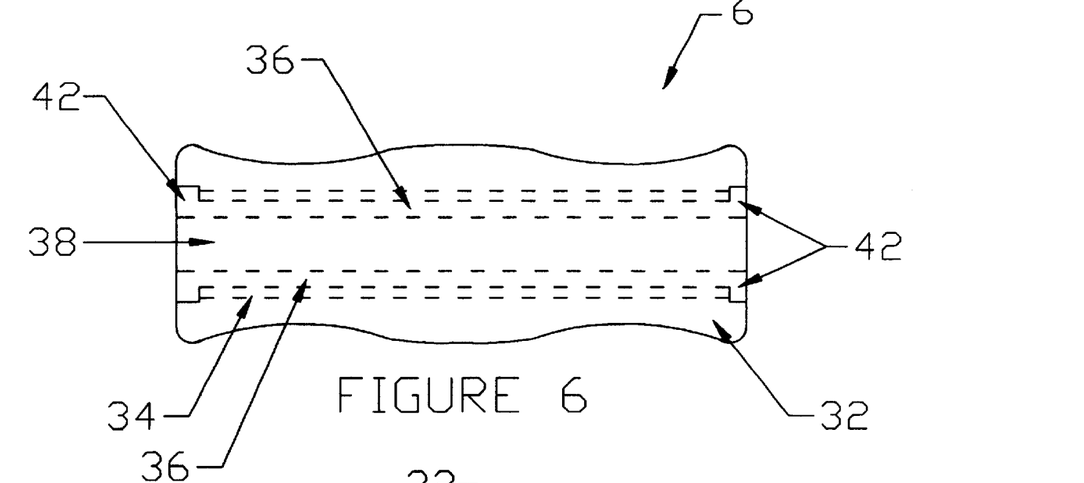
FIG. 6 is a top view of the most preferred embodiment of the present invention handle with broken lines showing an inner plastic core with an axial bore, an outer foam grip, and a bushing located between the plastic core and the grip.
Figure 7:
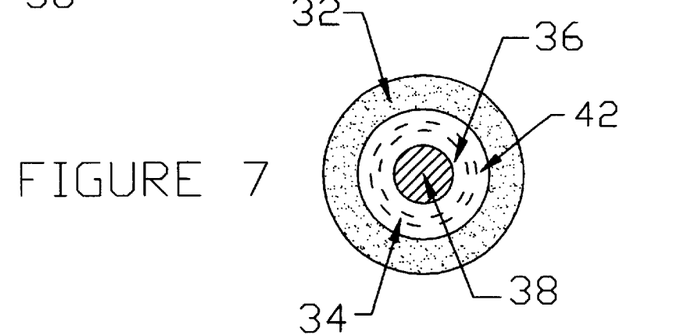
FIG. 7 is an end view of the most preferred embodiment of the present invention handle having an outer foam grip and an inner plastic core with an axial bore, with broken lines showing a bushing located between the grip and the plastic core.

FIGS. 6 and 7 show the most preferred embodiment of the present invention handle 6 having an axial bore 38, a central core 36, a bushing 34, and an outer grip 32. Broken lines in FIG. 6 show handle 6 having axial bore 38 within central core 36, with bushing 34 surrounding central core 36 and concentric thereto, and grip 32 concentric with bushing 34. For most effective use, it is contemplated for axial bore 38 to only be slightly larger than the diameter dimension of cord 8 so that cord 8 can move freely within axial bore 38 but the speed through which cord 8 can travel through axial bore 38 when lunging forces are applied to cord 8 is minimized. As shown by both FIGS. 6 and 7, it is contemplated for central core 36 to have a spool-like configuration with end flanges 42 that are perpendicular to axial bore 38. Bushing 34 is positioned around central core 36 between opposing end flanges 42. Outer grip 32 is formed around bushing 34 and central core 36, and extends to the outer surface of flanges 42, substantially covering the side edges of flanges 42. The resilient material forming grip 32 can have a uniform thickness, or one that is more centrally pronounced and thicker in the vicinity of flanges 42. Although it is contemplated for central core and bushing to be made from plastic, other suitable materials are also considered to be within the scope of the present invention. Further, grip 32 should be made from a resilient material, such as but not limited to a dense foam rubber. Thus when handle 6 is assembled, cord 8 is freely rotatable within axial bore 28, and upon the application of abrupt force, grip 32 and bushing 34 would move relative to central core 36 to further enhance the comfort of a user's hand. FIG. 7 shows axial bore 38, central core 36, bushing 34, and outer grip 32 from an end view perspective, with broken lines showing bushing 34 and central core 36 located behind the central core's end flange 42.

FIG. 8 shows cord 10 poised for positioning within the channel 24 formed between first clamping member 16 and second clamping member 28. Although cord 10 appears to be poised for entry into the exterior end of the channel 6 formed between first clamping member 16 and second clamping member 28, the preferred method of securing cord 10 between clamping members 16 and 28 would be to take either clamping member 16 or 28 in hand, or place it on a substantially flat surface, and lay the end of cord 10 within channel 24 so that it extends into cavity 40. Thereafter, the opposing clamping member 16 or 28 could be placed over cord 10, in a position aligning apertures 22. Thus, when threaded fasteners, such as bolts 30 are inserted through apertures 22 and secured with hex nuts 26, cord 10 would become crimped into a zigzag configuration and securely fixed between angled teeth 20 and ridges 18. An arrow attached to a broken line shows the zigzag positioning of cord 10 once secured inside channel 24 by angled teeth 20 and ridges 18. The configuration and thickness dimension of angled teeth 20 and ridges 18 shown in FIG. 8 is not critical, as long as the configuration and dimension used assists in preventing cord 10 from being easily withdrawn from channel 24. Also, FIG. 8 shows the same number of angled teeth 20 on both clamping members 16 and 28, with each of the angled teeth 20 being off-set from the next adjacent opposed angled teeth 20.

Figure 9:
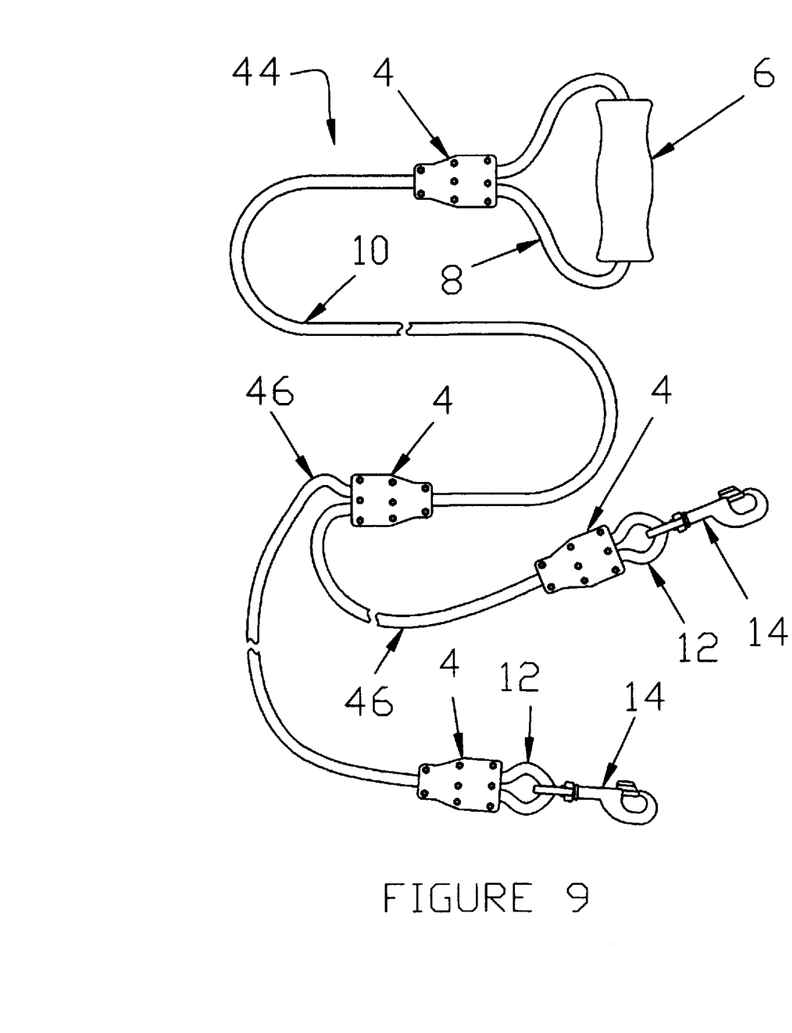
FIG. 9 is a top view of a second preferred embodiment of the present invention animal leash for simultaneously walking two pets, the second embodiment having six cords with one cord being an elongated middle cord, four locking mechanisms that connect the cords together and form each of the three end cords into a looped configuration, a handle attached to one of the looped cords, and a snap-bolt connected to each of the remaining looped cords.
Figure 10:
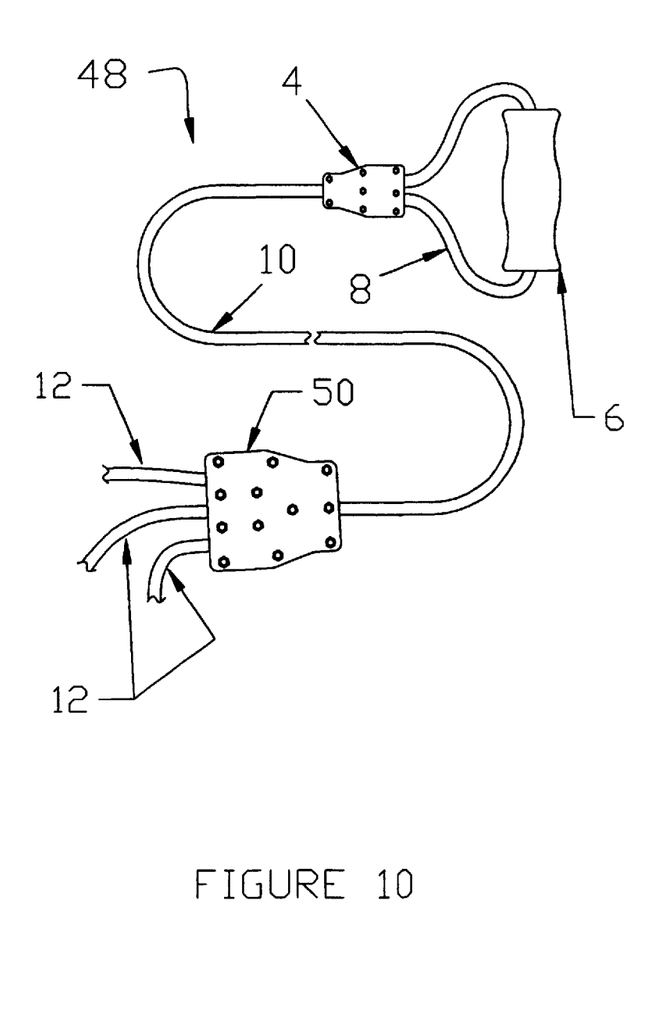
FIG. 10 is a top view of a third preferred embodiment of the present invention animal leash for simultaneously walking three pets, the third embodiment having at least five cords with one cord being an elongated middle cord, two dissimilar locking mechanisms that connect the cords together and form one of the four end cords into a looped configuration, a handle attached to the looped cord, and the three remaining end cords free for connection to another locking mechanism or direct connection to a snap-bolt or other animal collar attachment device.
Figure 11:
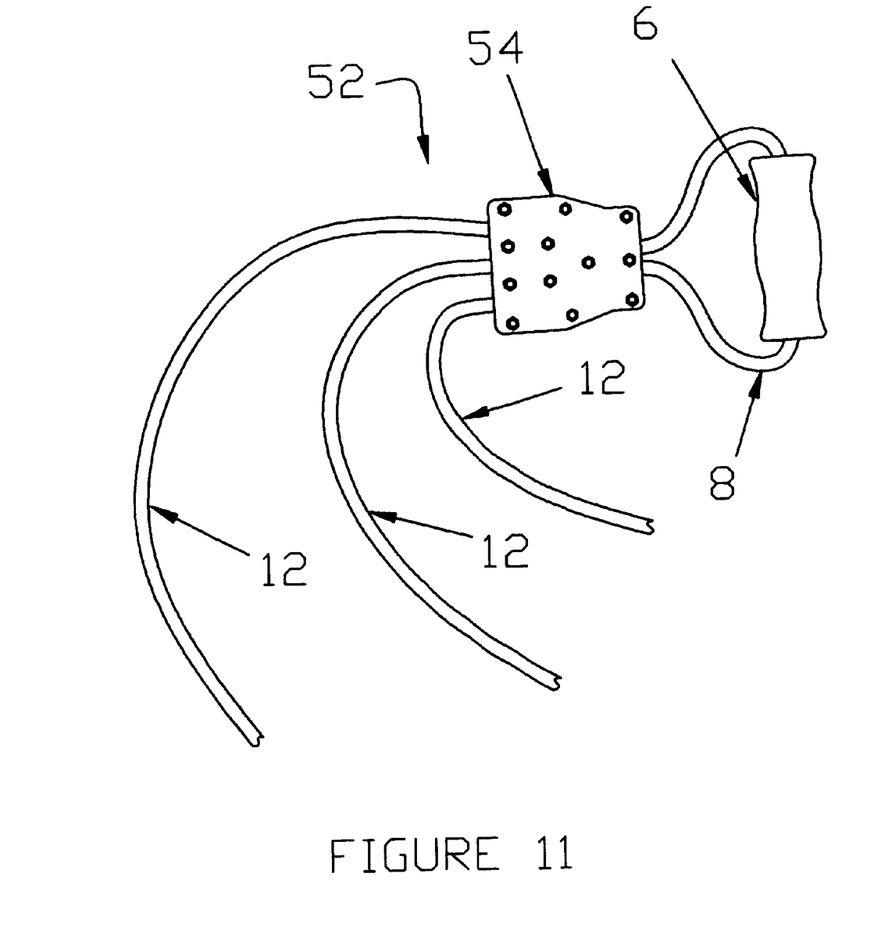
FIG. 11 is a top view of a fourth preferred embodiment of the present invention animal leash for simultaneously walking three pets, the fourth embodiment having at least four cords with one cord being an end cord formed into a looped configuration, one locking mechanism positioned between the looped cord and the three end cords, a handle attached to the looped cord, and the three remaining end cords free for connection to another locking mechanism or direct connection to a snap-bolt or other animal collar attachment device.

FIGS. 9, 10, and 11 show additional variations of the present invention, each for simultaneously walking or tethering more than animal. Since many variations are possible, the scope of the present invention should be determined by the appended claims and their legal equivalents, and not limited only to the examples described herein. FIG. 9 is a top view of a second preferred embodiment 44 of the present invention animal leash for simultaneously walking two pets (not shown). FIG. 9 shows second preferred embodiment 44 having six cords 8, 10, 12, and 46, with one being a looped end cord 8 of sufficient length for supporting a handle 6 configured for an adult human hand (not shown), one being an elongated middle cord 10, two being intermediate cords 46 each shorter than elongated cord 10, and two being short looped end cords 12 each formed into a looped configuration and supporting a snap-bolt 14. FIG. 9 also shows four similarly configured locking mechanisms 4 connecting cords 8, 10, 12, and 46. In contrast, FIG. 10 is a top view of a third preferred embodiment 48 of the present invention animal leash for simultaneously walking three pets. FIG. 10 shows third embodiment 48 having at least five cords 8, 10, and 12, with one being a looped end cord 8 of sufficient length for supporting a handle 6 configured for an adult human hand (not shown), one being an elongated middle cord 10, and three being end cords 12 each having a second end remaining free for connection to another locking mechanism or direct connection to a snap-bolt 12 or other animal collar attachment device (not shown). FIG. 10 also shows two locking mechanisms 4 and 50 of dissimilar size and configuration that connect the cords 8, 10, and 12 together. Locking mechanism 4 is configured for connection in end-to-end relation of three cord ends, with both of the blunt cord ends of cord 8 extending from the wider end of locking mechanism 4 and one of the blunt cord ends of cord 10 extending from the narrower opposing end of locking mechanism 4. The other locking mechanism 50 shown in FIG. 10 is configured for connection in end-to-end relation of four cord ends, with one of the blunt cord ends of cord 10 extending from the narrower end of locking mechanism 50 and one of the blunt cord ends of each of the three ends cords 12 extending from the wider opposing end of locking mechanism 50. In further contrast, FIG. 11 is a top view of a fourth preferred embodiment 52 of the present invention animal leash for simultaneously walking three pets (not shown). FIG. 11 shows fourth embodiment 52 having at least four cords with one being a looped end cord 8 of sufficient length for supporting a handle 6 configured for an adult human hand (not shown), and three being end cords 12 each remaining free for connection to another locking mechanism or direct connection to a snap-bolt 12 or other animal collar attachment device (not shown). FIG. 11 also shows one locking mechanisms 54 that connects cords 8 and 12 together in end-to-end relation. Locking mechanism 54 is configured for connection of four cord ends, with end cord 8 being formed into a looped configuration and extending from the narrower end of locking mechanism 54, and one end of each of the three ends cords 12 extending from the opposing wider end of locking mechanism 54. The second end of each cord 12 remains free for connection to another locking mechanism or direct connection to a snap-bolt 12 or other animal collar attachment device (not shown).

Although the dimensions of components in the present invention animal leash could vary and should not be limited hereto, the following dimensions provide an example of the comparative dimensions found in a preferred embodiment of the present invention locking mechanism 4 that would be used to secure cords 8, 10, and 12 having an outside diameter dimension of approximately three-eighths of an inch. When clamping members 16 and 28 would have an elongated octagonal configuration with a maximum width dimension of approximately one-and-one-half inches and a maximum length dimension of approximately two-and-three-eights inches, each channel 24 would have a length dimension of approximately one-and-one-fourth inches and a diameter dimension of approximately of three-eighths of an inch. In addition, the spaced-apart distances between angled teeth 20 would be approximately one-eighth of an inch, with the length dimension of cavity 40 being approximately three-eighths of an inch. The thickness dimension of ridges 18 could vary, and, even though the three ridges 18 within the first preferred embodiment are all shown to have the same thickness dimension, they could just as easily have varying thickness dimensions. However, it would be expected for each ridge 18 in the given example to have a maximum width dimension of approximately one-eighth of an inch to be in correct proportion with the other identified measurements.

What is claimed is:

1. An animal leash for improved control of animals having a tendency to lunge at objects beyond their reach while being walked and when tethered to stationary objects, said animal leash comprising:

at least one cord-locking mechanism having a first clamping member and a second clamping member, each said first and second clamping members having a plurality of channels with spaced-apart angled teeth and at least one ridge, said channels in said first and second clamping members in each said cord-locking mechanism each being aligned with one another, said spaced-apart angled teeth and ridges in each said clamping member being off-set from those in an opposing one of said clamping members;

a plurality of cords each having opposite ends, with all of said cords having at least one of said opposite ends extending longitudinally within one of said channels during use, at least one of said cords also having a slight amount of longitudinal stretch sufficient to allow a lunging animal to move slowly forward a short distance beyond the non-stretched length of said leash and then promptly urge the animal to withdraw from its lunging position without injury;

fastening means for securely connecting each said first clamping member to one said second clamping member;

a resilient handle connected to one of said cords in rotating relation thereto; and animal collar attachment means connected to one of said cords so that when said first and second clamping members in each said cord-locking mechanism used are securely drawn together around said opposite ends of said cords to connect them, and said handle and said animal collar attachment means are each connected to a different one of said cords, an animal leash is formed that enhances the comfort of animal and animal owner alike, and prevents injury to both even when an animal connected to said leash repeatedly attempts to lunge beyond said length's non-stretched length.

2. The animal leash of claim 1 wherein said fastening means comprises a plurality of threaded fasteners, and a plurality of aligned apertures through each said first and second clamping members, with each said aperture being configured to receive one of said threaded fasteners.

3. The animal leash of claim 2 wherein said threaded fasteners comprise a plurality of threaded bolts and a plurality of hex nuts.

4. The animal leash of claim 1 wherein said each of said clamping members further comprises an open exterior end, and each said ridge is positioned between said angled teeth and said exterior end.

5. The animal leash of claim 1 wherein each said stretchable cord comprises materials selected from a group consisting of extruded materials, rubber, rubber-like materials, and plastic.

6. The animal leash of claim 1 wherein said animal collar attachment means comprises a snap-bolt with a swivel.

7. The animal leash of claim 1 wherein said handle has an inner core, an outer grip, and a bushing positioned between said inner core and said outer grip.

8. The animal leash of claim 7 wherein said inner core is made from plastic and said outer grip is made from foam-like material.

9. The animal leash of claim 7 wherein said inner core has an axial bore and said axial bore is only slightly larger in diameter than the one of said cords supporting it.

10. An animal leash for improved control of animals having a tendency to lunge at objects beyond their reach while being walked and when tethered to stationary objects, said animal leash comprising:

at least one cord-locking mechanism having a first clamping member and a second clamping member, each said first and second clamping members having a minimum of three channels each with a closed interior end and an open exterior end, each of said channels also having a plurality of spaced-apart angled teeth and at least one ridge, each said ridge being positioned between said angled teeth and said exterior end, each said first and second clamping members also having a plurality of apertures therethrough with each of said apertures being configured to receive a threaded fastener, said channels in said first and second clamping members in each said cord-locking mechanism also each being aligned with one of said channels in the opposing one of said clamping members position, with said spaced-apart angled teeth and ridges in each said clamping member being off-set from those in an opposing one of said clamping members, said cord-locking mechanisms also having a plurality of threaded fasteners adapted for securely fixing said first and second clamping members together during use, said first and second clamping members also each having an identical number of apertures therethrough each aligned with a different one of said apertures in the one of said clamping members opposing is during use;

a plurality of cords each having opposite ends, with all of said cords having at least one of said opposite ends extending longitudinally within one of said channels during use, at least one of said cords also having a slight amount of longitudinal stretch sufficient to allow a lunging animal to move slowly forward a short distance beyond the non-stretched length of said leash and then promptly urge the animal to withdraw from its lunging position without injury;

a resilient handle connected to one of said cords in rotating relation thereto; and animal collar attachment means connected to one of said cords so that when said first and second clamping members in each said cord-locking mechanism used are securely drawn together around said opposite ends of said cords to connect them, and said handle and said animal collar attachment means are each connected to a different one of said cords, an animal leash is formed that enhances the comfort of animal and animal owner alike, and prevents injury to both even when an animal connected to said leash repeatedly attempts to lunge beyond said length's non-stretched length.

11. The animal leash of claim 10 wherein said threaded fasteners comprise a plurality of threaded bolts and a plurality of hex nuts.

12. The animal leash of claim 10 wherein each said stretchable cord comprises materials selected from a group consisting of extruded materials, rubber, rubber-like materials, and plastic.

13. The animal leash of claim 10 wherein said animal collar attachment means comprises a snap-bolt with a swivel.

14. The animal leash of claim 10 wherein said handle has an inner core, an outer grip, and a bushing positioned between said inner core and said outer grip.

15. The animal leash of claim 14 wherein said inner core is made from plastic and said outer grip is made from foam-like material.

16. The animal leash of claim 14 wherein said inner core has an axial bore and said axial bore is only slightly larger in diameter than the one of said cords supporting it.

17. A method for manufacturing an animal leash for improved control of animals having a tendency to lunge at objects beyond their reach while being walked and when tethered to stationary objects, and the enhanced comfort of animal and animal handler alike, said method comprising the steps of:

providing at least one cord-locking mechanism having two clamping members each with a minimum of three channels and the channels each having a plurality of spaced-apart angled teeth and at least one ridge, with said spaced-apart angled teeth and ridges in each said clamping member being off-set from those in an opposing one of said clamping members;

also providing a plurality of threaded fasteners, a plurality of cords with at least one of said cords also having a slight amount of longitudinal stretch sufficient to allow a lunging animal to move slowly forward a short distance beyond the non-stretched length of said leash and then promptly urge the animal to withdraw from its lunging position without injury, a resilient handle with an axial bore, and an animal collar attachment device;

inserting a first one of said cords through said axial bore of said handle;

concurrently connecting said animal collar attachment device to a second one of said cords; and securing at least one end of each of said cords between said clamping members in said cord-locking mechanisms with said threaded fasteners so that said cords are placed in end-to-end working relation to one another and at least one said stretchable cord becomes a central cord between said handle and said animal collar attachment device.

18. The method of claim 17 wherein each of said clamping members further comprises an open exterior end, and each said ridge is positioned between said angled teeth and said exterior end.

19. The method of claim 17 wherein said animal collar attachment means comprises a snap-bolt with a swivel and wherein said threaded fasteners comprise a plurality of threaded bolts and a plurality of hex nuts.

20. The method of claim 17 wherein said handle has an inner core, an outer grip, and a bushing positioned between said inner core and said outer grip.

* * * * *